(12) United States Patent
Berry et al.

(10) Patent No.: US 9,703,910 B2
(45) Date of Patent: Jul. 11, 2017

(54) CONTROL PATH POWER ADJUSTMENT FOR CHIP DESIGN

(71) Applicant: International Business Machines Corporation, Armonk, NY (US)

(72) Inventors: Christopher J. Berry, Hudson, NY (US); Kaustav Guha, Bangalore (IN); Jose L. Neves, Poughkeepsie, NY (US); Haifeng Qian, White Plains, NY (US); Sourav Saha, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 62 days.

(21) Appl. No.: 14/795,254

(22) Filed: Jul. 9, 2015

(65) Prior Publication Data
US 2017/0011156 A1    Jan. 12, 2017

(51) Int. Cl.
*G06F 17/00* (2006.01)
*G06F 17/50* (2006.01)

(52) U.S. Cl.
CPC ...... *G06F 17/5045* (2013.01); *G06F 17/5081* (2013.01)

(58) Field of Classification Search
USPC ......................................................... 716/110
See application file for complete search history.

(56) References Cited

U.S. PATENT DOCUMENTS

| | | | |
|---|---|---|---|
| 4,698,760 A | 10/1987 | Lembach et al. | |
| 8,332,802 B2 | 12/2012 | Haugestuen et al. | |
| 8,533,649 B2 | 9/2013 | Tirumala | |
| 8,640,067 B1 | 1/2014 | Hutton et al. | |
| 8,704,577 B2 | 4/2014 | Taskin et al. | |
| 8,776,003 B2 | 7/2014 | Zahn et al. | |
| 2002/0184548 A1* | 12/2002 | Lin | G06F 1/3203 713/322 |
| 2003/0014742 A1* | 1/2003 | Seth | G06F 8/443 717/158 |
| 2004/0230924 A1* | 11/2004 | Williams | G06F 17/505 716/103 |
| 2007/0028193 A1* | 2/2007 | Correale | G06F 17/5045 257/500 |
| 2012/0144353 A1 | 6/2012 | Kamdar et al. | |

(Continued)

OTHER PUBLICATIONS

S. Roy, et al., "Microarchitecture Aware Gate Sizing: A Framework for Circuit-Architecture Co-Optimization," 2010 IEEE International Conference on DOI: 10.1109/ICCD.2010.5647775 Publication Year: 2010, pp. 222-228.

(Continued)

*Primary Examiner* — Mohammed Alam
(74) *Attorney, Agent, or Firm* — Cantor Colburn LLP; Margaret A. McNamara

(57) ABSTRACT

Embodiments relate to power down processing including control path power adjustment. An aspect includes receiving, by a power down engine, chip layout data corresponding to a chip design. Another aspect includes determining a confluence point of a data path and a control path in the chip layout data. Another aspect includes determining the presence of a positive slack window in the control path of the confluence point. Yet another aspect includes powering up the control path to reduce the positive slack window.

12 Claims, 7 Drawing Sheets

(56) References Cited

U.S. PATENT DOCUMENTS

2013/0111425 A1\* 5/2013 Kumar .................. G06F 17/505
 716/104
2013/0145339 A1 6/2013 Mottaez et al.
2013/0205272 A1 8/2013 Kim et al.
2015/0269304 A1\* 9/2015 Zahn ................... G06F 17/5081
 716/113

OTHER PUBLICATIONS

Christopher J. Berry, et al., "Control Path Power Adjustment for Chip Design," U.S. Appl. No. 14/842,307, filed Sep. 1, 2015.
List of IBM Patents or Patent Applications Treated as Related; Date File: Jul. 9, 2015, pp. 1-2.

\* cited by examiner

CONTROL PATH POWER ADJUSTMENT FOR CHIP DESIGN

BACKGROUND

The present invention relates generally to chip design, and more specifically, to control path power adjustment for chip design.

After determination of an initial layout of a chip, for example, a system on a chip (SOC), during the design phase, power reduction processing may be performed on the chip layout in order to reduce the overall power consumed by the chip. Various power reduction techniques may be applied to a chip design. Power reduction processing may also be referred to as power down processing, and may be performed by changing various components of a chip design (for example, standard cells or devices) in order to achieve additional power savings without hurting chip performance. For example, the assigned drive strength and threshold voltage of a chip component in the initial chip layout may be more than is required to meet the performance targets of the chip; therefore, the chip component may be replaced with a lower drive strength or slower threshold voltage device by the power down processing. Power down processing may be performed by parsing a data structure, such as a netlist, of the chip design and evaluating power down suitability of each component in the chip design. The netlist is a data structure that describes the topology of an electronic design by listing all components of the device, including of all the component terminals, and the various electrical connections between the various component terminals.

SUMMARY

Embodiments include a method, system, and computer program product for power down processing including control path power adjustment. An aspect includes receiving, by a power down engine, chip layout data corresponding to a chip design. Another aspect includes determining a confluence point of a data path and a control path in the chip layout data. Another aspect includes determining the presence of a positive slack window in the control path of the confluence point. Yet another aspect includes powering up the control path to reduce the positive slack window.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments of control path power adjustment for chip design are provided, with exemplary embodiments being discussed below in detail. Power down processing that includes control path power adjustment takes into account the overall chip layout, or topology, and targets chip components that are part of the control path for power adjustment before evaluating data path components. The control path may be relatively narrow and include relatively few components as compared to the data path, and may also have relatively strict timing requirements as compared to the data path. Signal timing at any confluence point between the control path and the data path in the chip layout may be evaluated to determine if there is a positive slack window in the control path at the confluence point. If such a positive slack window exists in the control path, the power in the control path may be adjusted, i.e., increased or powered up, in order to reduce or remove the slack window. After the control path is powered up, power down processing is performed in the output data path of the confluence point. After removal of the slack window in the control path, relatively large power savings may be possible in the output data path while continuing to meet overall chip timing requirements.

A control path is a relatively narrow path that terminates on a confluence point. A confluence point occurs wherever a data path and a control path logically intercept each other at, for example, a chip component such as a multiplexer. Any high fan-out point (e.g., a point where a relatively large number of buses converge) in the chip design may be identified as a confluence point. The power down engine may be configured to identify data path and control path confluence points in, for example, a netlist of the chip design, based on the interconnections between the chip components. The power down engine may identify various patterns in the chip layout netlist to determine the presence of confluence points that triggers control path power adjustment processing. The power down engine may perform control path power adjustment at any appropriate phase in the chip design process, for example, in the placement phase of the chip design in some embodiments, or during the post-routing netlist optimization phase in some embodiments.

Figure 1:
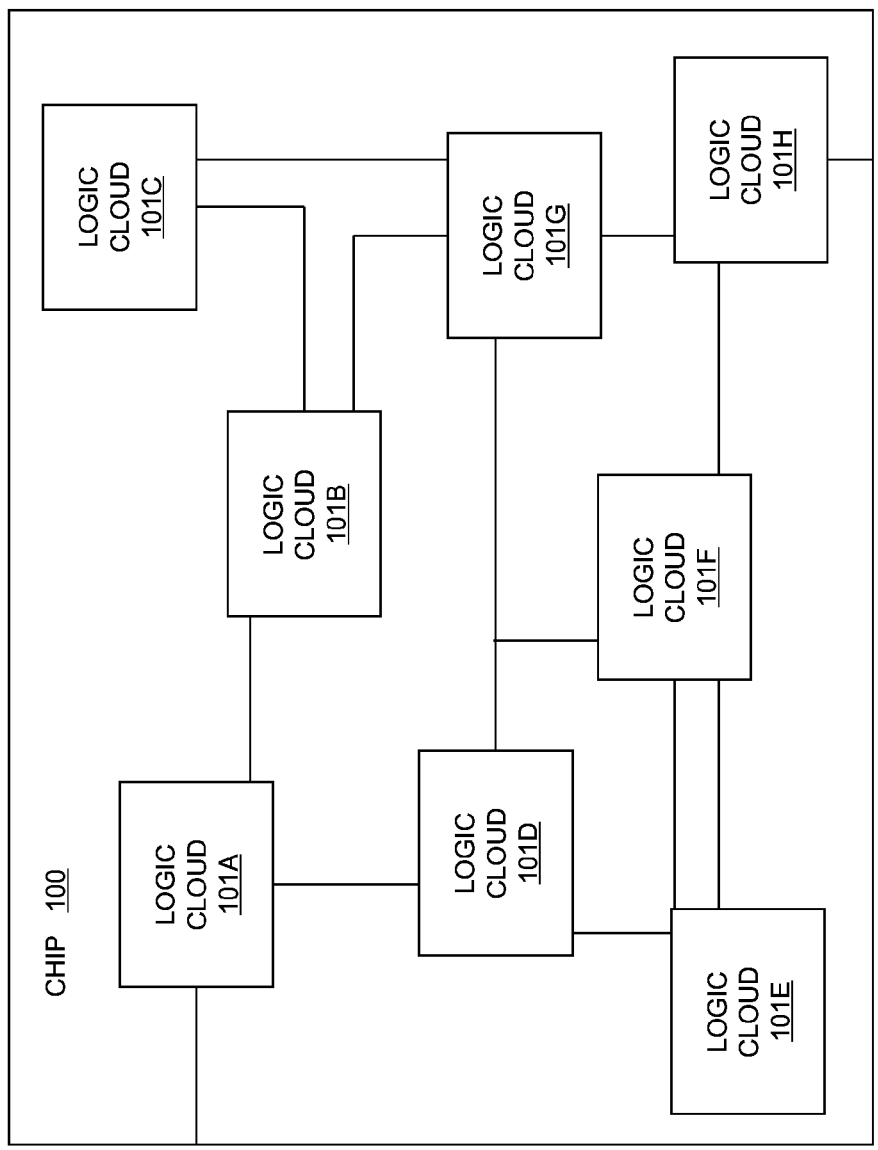
FIG. 1 depicts a chip in accordance with an embodiment.

FIG. 1 illustrates an embodiment of a chip 100 that includes a plurality of interconnected components. The chip 100 as shown in FIG. 1 is made up of a plurality of logic clouds 101A-H. Logic clouds 101A-H may each include any number and appropriate type of logic components, including but not limited to latches, flip flops, and logic gates, that are interconnected in any appropriate manner. Various paths, or buses, connect the logic clouds 101A-H. FIG. 1 is shown for illustrative purposes only; a chip such as chip 100 may include any appropriate number and type of components that are interconnected in any appropriate manner.

Figure 2A:
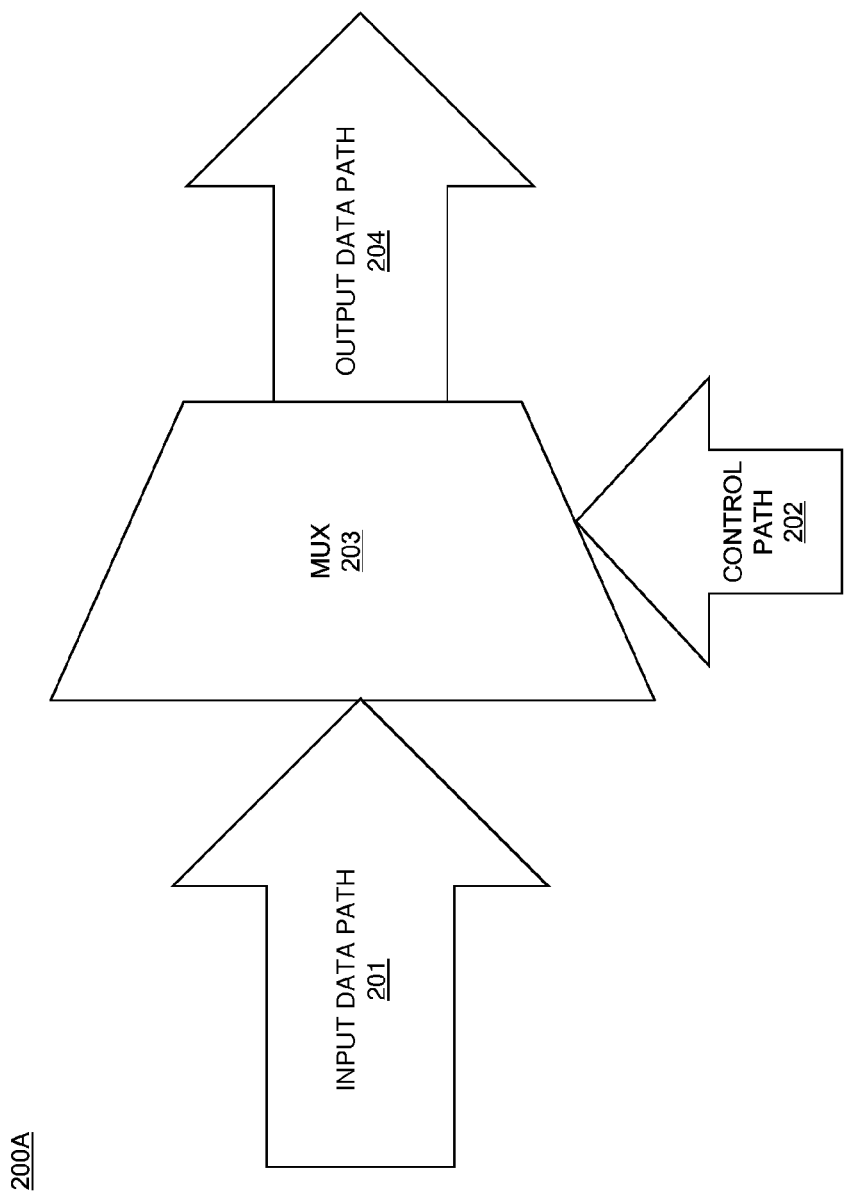
FIGS. 2A-B depict a circuit including a control path and a data path in accordance with an embodiment.
Figure 2B:
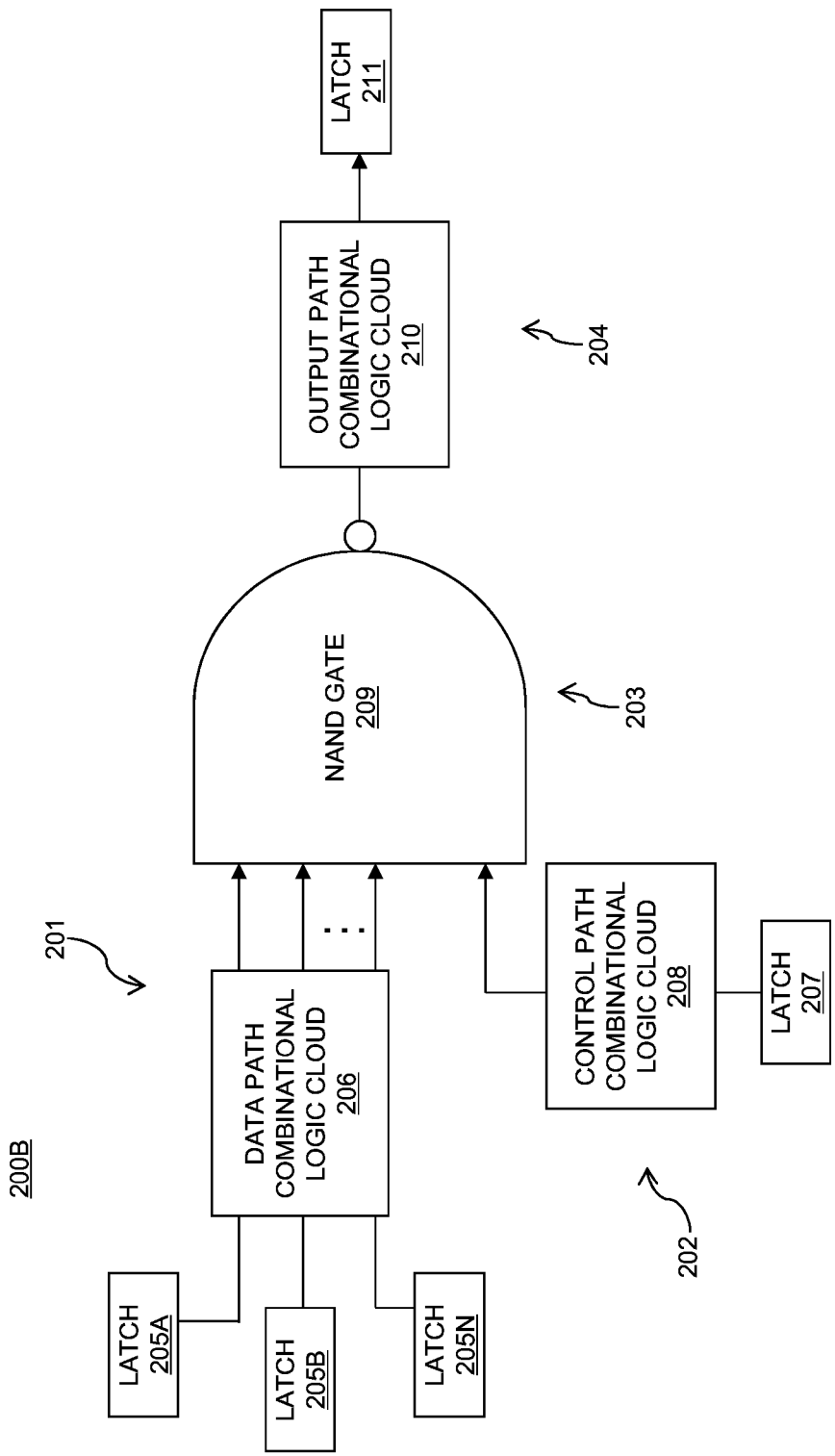

FIGS. 2A-B illustrate embodiments of circuits 200A-B including a control path and a data path. Circuits 200A-B are a data path/control path confluence point, where a input data path 201 and a control path 202 converge, and may comprise any of logic clouds 101A-H of chip 100 of FIG. 1. Chip 100 such as is shown in FIG. 1 may include any appropriate number of data path/control path confluence points such as are shown in FIGS. 2A-B. As shown in FIG. 2A, circuit 200A includes a input data path 201, a control path 202, a multiplexer 203, and an output data path 204. The input data path 201 and the output data path 204 may be relatively wide, and include a larger number of buses and logic components, as compared to the control path 202, which may include only a single bus in some embodiments. The multiplexer 203 may select data from the input data path 201 based on the control path 202, and output the selected data on the output data path 204. The output data path 204 may include any appropriate number of signals, or buses, in various embodiments. Further, the output data path 204 may be an input data path for another confluence point in the chip; therefore, timing gains in the output data path 204 may result in timing gains at another confluence point. A more detailed example of a circuit 200B that comprises a data path/control path confluence point is shown in FIG. 2B. The input data path 201, as was shown in FIG. 2A, includes a plurality of data inputs, each comprising a respective bus and a respective latch of latches 205A-N, and a data path combination logic cloud 206. The input data path 201 inputs data to the NAND gate 209, which comprises multiplexer 203. The control path 202 includes a single bus that inputs the control signal to the NAND gate 209, and is made up of a latch 207 and a control combination logic cloud 208. The output data path 204 includes an output path combinational logic cloud 210, and an output latch 211, at which the output of NAND gate 209 is provided. FIGS. 2A-B is shown for illustrative purposes only; for example, in various embodiments, a data path may include any appropriate number of signals. Further, a confluence point as is illustrated in FIGS. 2A-B may include any appropriate number and type of components.

Figure 3:
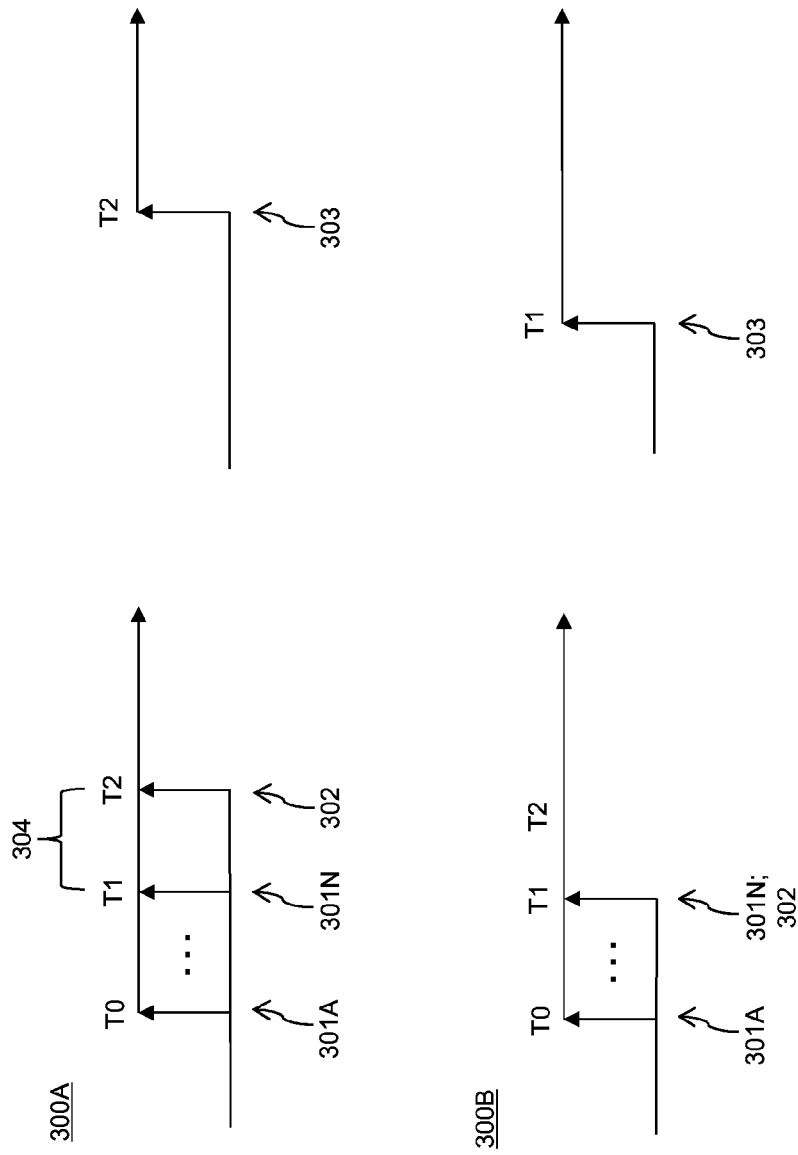
FIG. 3 illustrates examples of control path, data path, and output signals at a confluence point in accordance with an embodiment.

FIG. 3 illustrates examples of signals 300A-B comprising data and control input signals to a data path/control path confluence point as was shown in FIGS. 2A-B, and corresponding confluence point output signals. Signals 300A comprise input data signals 301A-N, control signal 302, and output data signal 303 before power adjustment has been performed in the control path 202. Control signal 302 arrives at the multiplexer 203 on control path 202 after all of the input data signals 301A-N of the input data path 201, so that the output data signal 303 is not output by the multiplexer 203 on output data path 204 until after the control signal 302 is received at time T2. The time between T1, when the last input data signal 301N arrives at multiplexer 203, and T2, when the control signal 302 arrives at multiplexer 203 in signals 300A, is the slack window 304 of the control path, and comprises a positive slack window. Signals 300B comprises input data signals 301A-N, control signal 302, and output data signal 303 after power correction in the control path 202 to reduce or remove of the positive slack window 304 from the control path 202. Powering up the control path 202 causes the control signal 302 to arrive at the multiplexer 203 sooner (i.e., at time T1), so that the output data signal 303 is also output by the multiplexer at time T1. Powering up the control path 202 may lead to timing gains in the chip, allowing power down processing that is subsequently performed in the output data path 204 to make offsetting power down adjustments with overall power savings.

Figure 4:
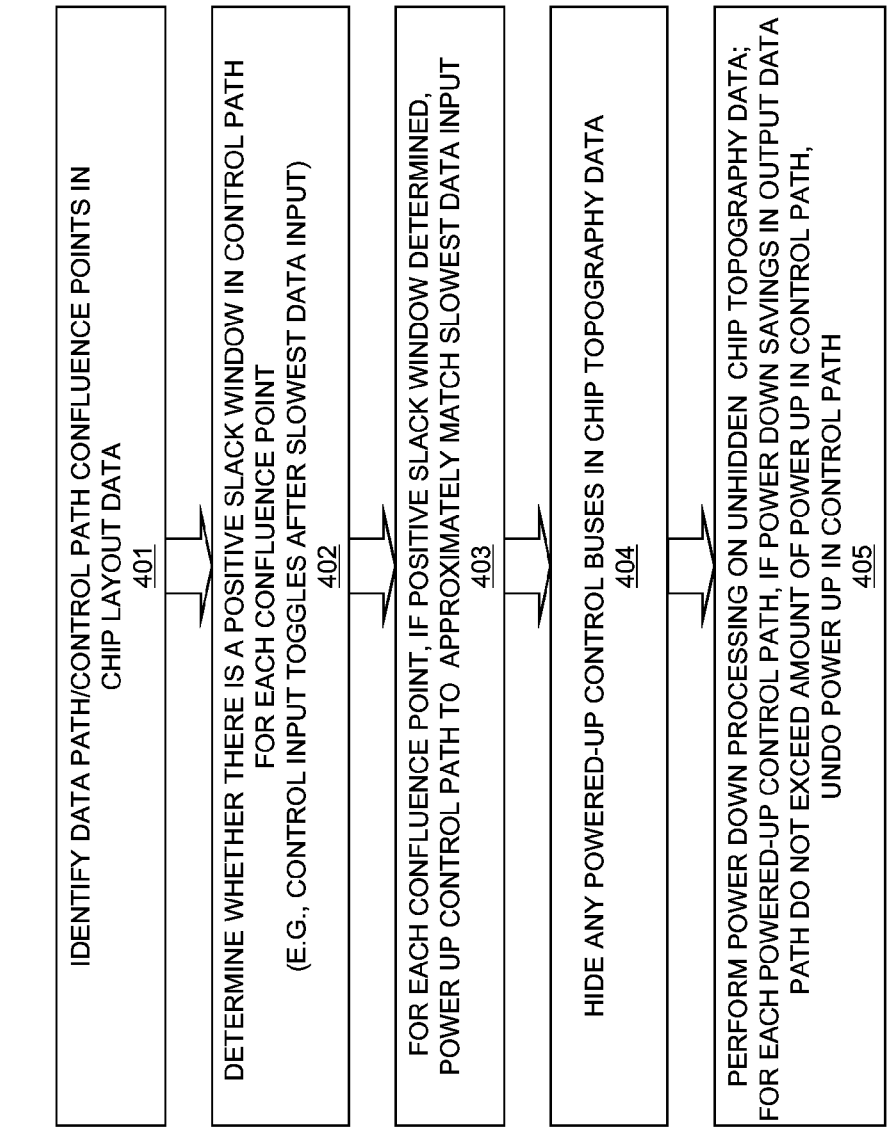
FIG. 4 depicts a process flow for control path power adjustment for chip design in accordance with an embodiment.

FIG. 4 illustrates a flowchart of an embodiment of a method 400 for control path power adjustment for chip design. FIG. 4 is discussed with respect to FIGS. 1 and 2A-B. First, in block 401, the topology of a chip 100 is searched for data path/control path confluence points. An example of a data path/control path confluence point that may be identified in block 401 is shown in FIGS. 2A-B. A chip 100 may include any appropriate number of data path/control path confluence points. In some embodiments of block 401, the control path/data path confluence points are identified by based on a graph data that gives the structure of the chip design (for example, a netlist). The graph data structure may be traversed using a depth-first approach, and various pruning and validation rules may be applied to isolate paths of the control and data types. The depth-first traversal may begin from primary inputs to the chip, and at latch outputs in the chip design. The depth-first traversal may terminate at primary outputs of the chip, and at latch inputs and control points. Confluence points are points in the chip design where the fan-out of signal paths that converge on the single point exceeds a specified threshold and may comprise, for example, components such as a logic gate such as a NAND gate, or a multiplexer.

Next, in block 402, for each of the data path/control path confluence points that were identified in block 401, it is determined whether there exists a positive slack window in the control path. A positive slack window exists when the control path signal toggles after all of the data path signals that are received at the data path/control path confluence point. An example of a positive slack window 304 in the control path is shown in signals 300A of FIG. 3. In some embodiments of block 402, after identification of the confluence points in block 401, power-up opportunities are determined in the control path based on a descending sorted list of all relatively high fan-out points (i.e., confluence points) in the chip design, and the relative slack window in the control path with respect to slowest data signal(s) is determined for each confluence point in block 402.

Next, in block 403, for each data path/control path confluence point that was determined in block 402 to have a positive slack window, the control path may be powered up to reduce or remove the positive slack window, such that the control signal arrives at the confluence point at roughly the same time as the slowest data signal. An example of data path, control path, and output signals after powering up the control path as is performed in block 403 is illustrated by signals 300B of FIG. 3. In some embodiments, the confluence points may be sorted in block 403 based on the determined slack windows, and power-up analysis may be performed in block 403 in order for each confluence point that has a positive slack window.

Next, in block 404, the components of any powered up control paths are hidden in the chip topology. For example, in some embodiments, a "don't touch" attribute may be set in the netlist for all on powered-up devices in the control path. Then, in block 405, power down processing is performed on the chip topology such that any powered up control path components are not touched by the power down processing. The power down processing is performed on all output data path components in block 405. The power down processing may be performed around each confluence point. After power down processing is performed at a confluence point where the control path was powered up in block 403, it is determined whether the power down processing in the output data path was able to save sufficient power at the confluence point to offset the power up in the control path. The power up in the control path may be undone if there is not a net power reduction at the confluence point. Power down processing is performed conventionally for confluence points at which the control bus was not powered up in block 403.

Figure 5:
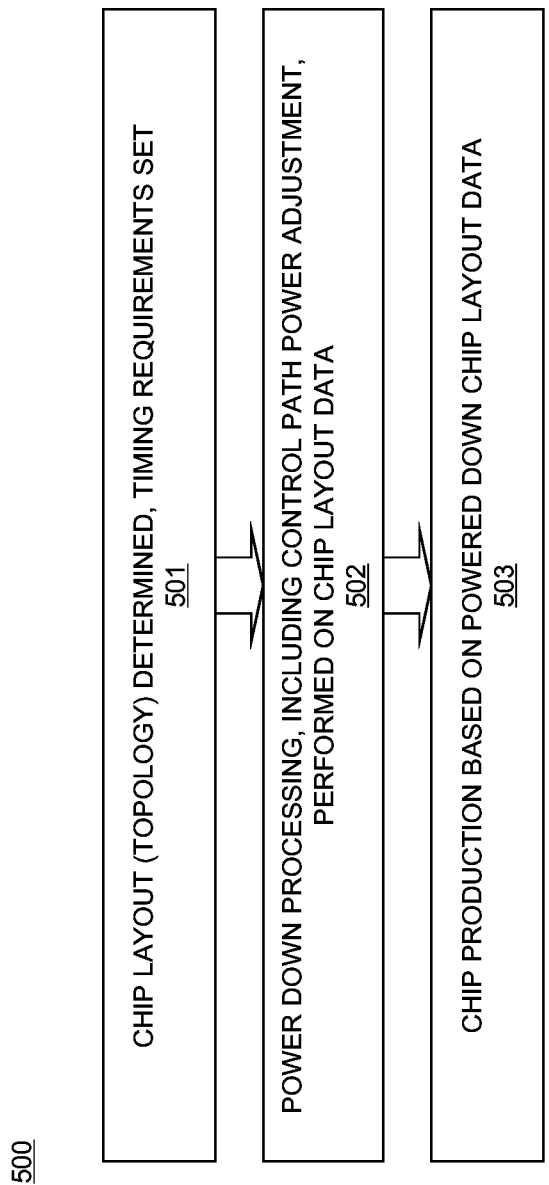
FIG. 5 depicts a process flow for chip design that include control path power adjustment in accordance with an embodiment.

FIG. 5 illustrates an embodiment of a method 500 for chip design. First, in block 501, an initial layout and timing requirements of a chip are determined. A data structure, such as a netlist, that gives information regarding the chip components and their interconnections in the initial chip layout is generated in block 501. Then, in block 502, power down processing that includes control path power adjustment is performed on the chip layout that was determined in block 501. The power down processing is performed as described above with respect to method 400 of FIG. 4. Then, in block 503, after the power down processing including control path power adjustment is completed, the adjusted chip layout is used to produce a physical chip.

Figure 6:
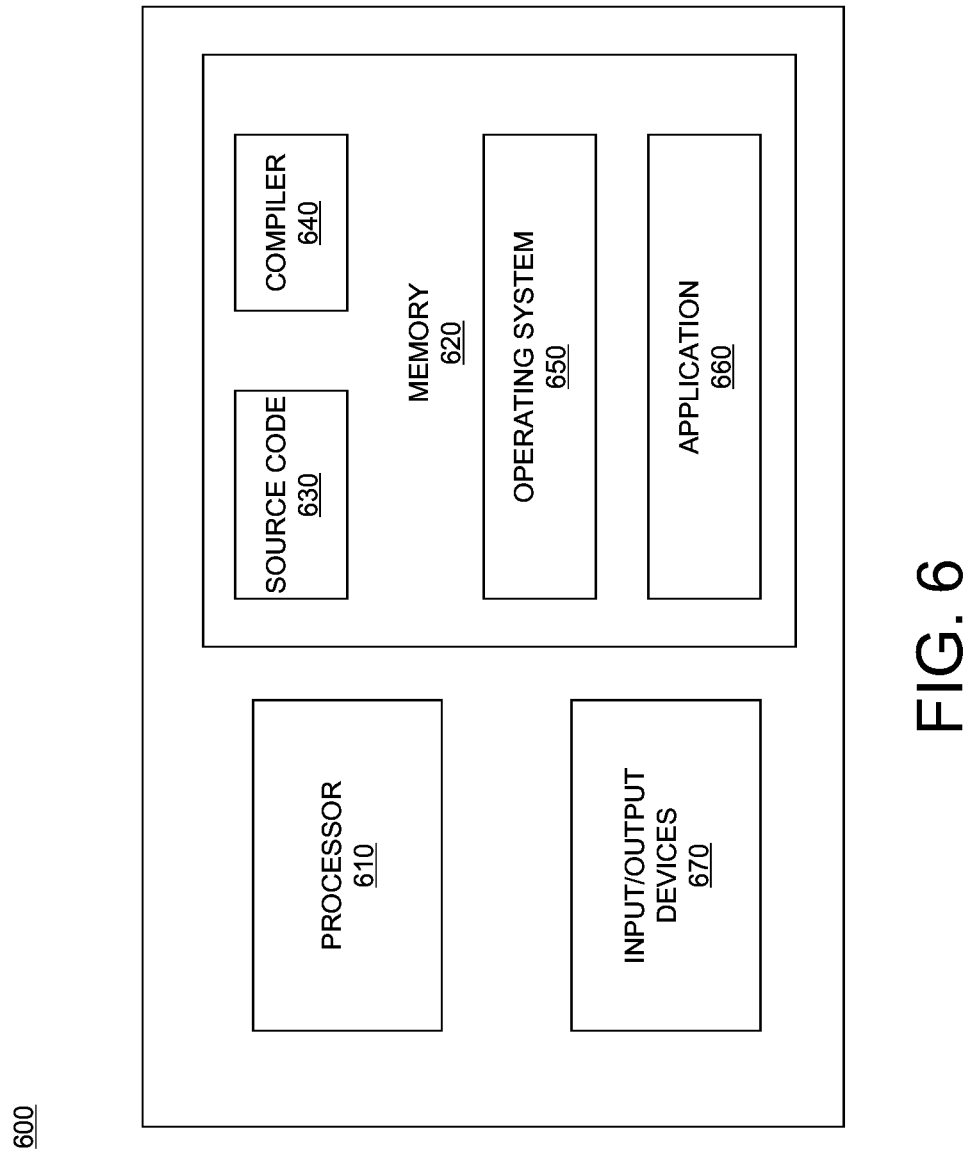
FIG. 6 depicts an example of a computer system that may be used in conjunction with embodiments of control path power adjustment for chip design.

FIG. 6 illustrates an example of a computer 600 which may be utilized by exemplary embodiments of control path power adjustment. Various operations discussed above may utilize the capabilities of the computer 600. One or more of the capabilities of the computer 600 may be incorporated in any element, module, application, and/or component discussed herein.

The computer 600 includes, but is not limited to, PCs, workstations, laptops, PDAs, palm devices, servers, storages, and the like. Generally, in terms of hardware architecture, the computer 600 may include one or more processors 610, memory 620, and one or more I/O devices 670 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in the memory 620. The processor 610 can be virtually any custom made or commercially available processor, a central processing unit (CPU), a digital signal processor (DSP), or an auxiliary processor among several processors associated with the computer 600, and the processor 610 may be a semiconductor based microprocessor (in the form of a microchip) or a macroprocessor.

The memory 620 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 620 may incorporate electronic, magnetic, optical, and/or other types of storage media. Note that the memory 620 can have a distributed architecture, where various components are situated remote from one another, but can be accessed by the processor 610.

The software in the memory 620 may include one or more separate programs, each of which comprises an ordered listing of executable instructions for implementing logical functions. The software in the memory 620 includes a suitable operating system (O/S) 650, compiler 640, source code 630, and one or more applications 660 in accordance with exemplary embodiments. As illustrated, the application 660 comprises numerous functional components for implementing the features and operations of the exemplary embodiments. The application 660 of the computer 600 may represent various applications, computational units, logic, functional units, processes, operations, virtual entities, and/or modules in accordance with exemplary embodiments, but the application 660 is not meant to be a limitation.

The operating system 650 controls the execution of other computer programs, and provides scheduling, input-output control, file and data management, memory management, and communication control and related services. It is contemplated by the inventors that the application 660 for implementing exemplary embodiments may be applicable on all commercially available operating systems.

Application 660 may be a source program, executable program (object code), script, or any other entity comprising a set of instructions to be performed. When a source program, then the program is usually translated via a compiler (such as the compiler 640), assembler, interpreter, or the like, which may or may not be included within the memory 620, so as to operate properly in connection with the O/S 650. Furthermore, the application 660 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 670 may include input devices such as, for example but not limited to, a mouse, keyboard, scanner, microphone, camera, etc. Furthermore, the I/O devices 670 may also include output devices, for example but not limited to a printer, display, etc. Finally, the I/O devices 670 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 670 also include components for communicating over various networks, such as the Internet or intranet.

If the computer 600 is a PC, workstation, intelligent device or the like, the software in the memory 620 may further include a basic input output system (BIOS) (omitted for simplicity). The BIOS is a set of essential software routines that initialize and test hardware at startup, start the O/S 650, and support the transfer of data among the hardware devices. The BIOS is stored in some type of read-only-memory, such as ROM, PROM, EPROM, EEPROM or the like, so that the BIOS can be executed when the computer 600 is activated.

When the computer 600 is in operation, the processor 610 is configured to execute software stored within the memory 620, to communicate data to and from the memory 620, and to generally control operations of the computer 600 pursuant to the software. The application 660 and the O/S 650 are read, in whole or in part, by the processor 610, perhaps buffered within the processor 610, and then executed.

When the application 660 is implemented in software it should be noted that the application 660 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 660 can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any means that can store the program for use by or in connection with the instruction execution system, apparatus, or device. The computer readable storage medium can be, for example but not limited to, an electronic, magnetic, optical, electromagnetic, or semiconductor system, apparatus, or a device.

More specific examples (a nonexhaustive list) of the computer-readable storage medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable storage medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 660 is implemented in hardware, the application 660 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects and benefits include reduced power use in a chip while meeting timing requirements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for implementing power down processing including control path power adjustment, the computer program product comprising:
   a non-transitory computer readable storage medium having program instructions embodied therewith, the program instructions readable by a processing circuit to cause the processing circuit to perform a method comprising:
   receiving, by a power down engine, chip layout data corresponding to a chip design;
   determining a confluence point of a data path and a control path in the chip layout data, wherein the confluence point is where the data path and the control path logically intercept each other;
   determining the presence of a positive slack window in the control path of the confluence point;
   powering up the control path to reduce the positive slack window;
   performing power down processing on the output data path of the confluence point, wherein the power down processing is not performed on the control path;
   determining an amount of additional power savings achieved by the power down processing in the data path; and
   based on the determined amount of additional power savings being less than an amount of the power up in the control path, undoing the power up in the control path.

2. The computer program product of claim 1, wherein performing power down processing on the data path of the confluence point comprises changing one or more electrical components of the data path in the chip layout data to lower power electrical components.

3. The computer program product of claim 1, wherein powering up the control path to reduce the positive slack window comprises changing one or more electrical components of the control path in the chip layout data to higher power electrical components, such that a control signal at the control path arrives at the confluence point at approximately the same time as a slowest data signal of the data path.

4. The computer program product of claim 1, wherein the positive slack window in the control path comprises an amount of time a control signal of the control path arrives at the confluence point after a slowest data signal of the data path.

5. The computer program product of claim 1, wherein the confluence point is identified based on a number of signal buses that converge at the confluence point being higher than a threshold.

6. A computer system for power down processing including control path power adjustment, the system comprising:
   a memory; and
   a processor, communicatively coupled to said memory, the computer system configured to perform a method comprising:
   receiving, by a power down engine, chip layout data corresponding to a chip design;
   determining a confluence point of a data path and a control path in the chip layout data, wherein the confluence point is where the data path and the control path logically intercept each other;
   determining the presence of a positive slack window in the control path of the confluence point;
   powering up the control path to reduce the positive slack window;
   performing power down processing on the data path of the confluence point, wherein the power down processing is not performed on the control path;
   determining an amount of power savings achieved by the power down processing in the data path; and
   based on the determined amount of power savings being less than an amount of the power up in the control path, undoing the power up in the control path.

7. The system of claim 6, wherein performing power down processing on the data path of the confluence point comprises changing one or more electrical components of the data path in the chip layout data to lower power electrical components.

8. The system of claim 6, wherein powering up the control path to reduce the positive slack window comprises changing one or more electrical components of the control path in the chip layout data to higher power electrical components, such that a control signal at the control path arrives at the confluence point at approximately the same time as a slowest data signal of the data path.

9. The system of claim 6, wherein the positive slack window in the control path comprises an amount of time a control signal of the control path arrives at the confluence point after a slowest data signal of the data path.

10. The computer program product of claim 2, wherein the power down processing is performed based on predetermined timing requirements of the chip design.

11. The computer program product of claim 1, wherein the confluence point comprises a multiplexer.

12. The computer program product of claim 1, wherein the chip layout data comprises a netlist.

* * * * *